United States Patent [19]

Hara et al.

[11] 4,251,175

[45] Feb. 17, 1981

[54] PIPE BURR CUTTING APPARATUS

[75] Inventors: Keiichi Hara; Tomoji Fujisawa, both of Yokohama, Japan

[73] Assignee: Nippon Kokan Kabushiki Kaisha, Tokyo, Japan

[21] Appl. No.: 39,295

[22] Filed: May 15, 1979

[30] Foreign Application Priority Data

May 19, 1978 [JP] Japan .................................. 53/59755
May 19, 1978 [JP] Japan .................................. 53/59756
May 19, 1978 [JP] Japan ............................ 53/67354[U]

[51] Int. Cl.$^3$ .................................................. B23C 3/13
[52] U.S. Cl. ...................................................... 409/140
[58] Field of Search .................. 409/140; 51/340, 343; 15/104.1 R, 179; 408/72 R

[56] References Cited

U.S. PATENT DOCUMENTS

| | | | |
|---|---|---|---|
| 1,912,419 | 6/1933 | Whitman | 409/140 X |
| 2,054,311 | 9/1936 | Adams, Jr. | 409/140 X |
| 4,084,484 | 4/1978 | Shklyanov | 409/140 |

FOREIGN PATENT DOCUMENTS

| | | | |
|---|---|---|---|
| 681465 | 10/1952 | United Kingdom | 409/140 |
| 851847 | 10/1960 | United Kingdom | 15/104.1 R |
| 1116784 | 6/1968 | United Kingdom | 15/104.1 R |
| 1231685 | 5/1971 | United Kingdom | 15/104.1 R |
| 1243613 | 8/1971 | United Kingdom | 15/104.1 R |
| 1397542 | 6/1975 | United Kingdom | 409/140 |
| 1510086 | 5/1978 | United Kingdom | 408/72 R |
| 559781 | 6/1977 | U.S.S.R. | 409/140 |

*Primary Examiner*—William R. Briggs
*Attorney, Agent, or Firm*—Frishauf, Holtz, Goodman & Woodward

[57] ABSTRACT

An inner burr cutting and inner surface cleaning apparatus comprises a base, a carriage mounted on the base and reciprocable along a long pressure-welded pipe of medium and small diameters, a supporting tube supported at one end thereof by the carriage and insertable into the pipe having an inner burr produced on an inner surface thereof, a first motor mounted on the carriage, a rotary shaft coaxially inserted into the supporting tube, having one end protruding from the other end of the supporting tube and rotated at the other end by the first motor, an inner burr cutting device fixedly mounted on the rotary shaft for cutting off the inner burr, sets of rollers, each set thereof being arranged circumferentially on an outer periphery of the supporting tube for contacting the inner surface of the pipe, a centering device disposed at the other end of the supporting tube for centering the cutting device in the pipe, a second motor mounted on the centering device and having a drive shaft coaxial with the rotary shaft, a spatter crushing device driven by the drive shaft, an electomagnet device provided at either the forward end of rear end of the spatter crushing device, and a spattering prevention device disposed between the burr cutting device and the carriage.

16 Claims, 5 Drawing Figures

PIPE BURR CUTTING APPARATUS

This invention relates to an apparatus for cutting off inner burrs produced on the inner surface of long pressure-welded pipes of medium and small diameters to clean the interior or inner surface of the pipes.

Where, for example, a submarine or ground pipe line is constructed, steel pipes are sometimes pressure-welded. In this case, the customary practice is to cut off burrs produced on the inner and outer surfaces of pressure-welded pipes. For removal of burrs from the inner surfaces of pressure-welded pipes, it is necessary first to cut off inner burrs by a cutter and then clean the pipe interior by taking off chips or spatters produced during cutting or pressure-welding. An apparatus used to cut off burrs grown on the inner surfaces of pressure-welded pipes of a large diameter consists of a rotary cutter, a mechanism for drawing the rotary cutter to the pipe inner surface and a drive mechanism for the rotary cutter, and is made to travel along the pressure-welded pipes.

The above-mentioned burr cutter having a large size can not be used to cut off burrs produced on the inner surfaces of pressure-welded pipes of medium and small diameters. To date, therefore, burrs appearing on the inner surfaces of pressure-welded pipes of medium and small diameters have been cut off by a burr-cutting apparatus set forth, for example, in Japanese patent disclosure No. 92254/1975. According to this apparatus, a shaft whose forward end is fitted with a cutter is inserted into pressure-welded pipes, and made to travel through the pipes, while being rotated by an external drive means. However, this prior burr-cutting apparatus has the drawback that the cutter tends to abrade pipe inner surfaces when the shaft is put into and taken out of the pressure-welded pipes, and is unadapted to be used particularly with pipes whose inner surfaces are painted.

The object of this invention is to provide an apparatus for cutting off burrs produced on the inner surfaces of long pressure-welded pipes of medium and small diameters and cleaning the pipe interior, which can cut off burrs reliably and completely and clean the pipe interior at the same time as the cutting of burrs.

SUMMARY OF THE INVENTION

According to this invention, there is provided an inner burr cutting and inner surface cleaning apparatus comprising a base, a carriage mounted on the base and reciprocable along a long pressure-welded pipe of medium and small diameters, a supporting tube supported at one end thereof by the carriage and inserted into the pipe having an inner burr produced on an inner surface thereof, a first motor mounted on the carriage, a rotary shaft coaxially inserted into the supporting tube, having one end protruding from the other end of the supporting tube and rotated at the other end by the first motor, an inner burr cutting device fixedly mounted on the rotary shaft for cutting off the inner burr, sets of rollers, each set thereof being arranged circumferentially on an outer periphery of the supporting tube for contacting the inner surface of the pipe, a centering device disposed at the other end of the supporting tube for centering the cutting device in the pipe, a second motor mounted on the centering device and provided with a drive shaft coaxial with the rotary shaft, a spatter crushing device driven by the drive shaft, an electromagnet device provided at either the forward end or rear end of the spatter crushing device, and a spattering prevention device disposed between the burr cutting device and the carriage.

The above-mentioned apparatus embodying this invention carries out the cutting-off burrs from the inner surfaces of long pressure-welded pipes of medium and small diameters, the crushing of spatters and the removal of burr chips and spatters from the pipe interior all at once. Further, the present apparatus can cut off burrs produced on the inner surfaces of pressure-welded pipes without damaging a painted layer, even if it is applied on the inner surfaces.

DETAILED DESCRIPTION

Figure 1:
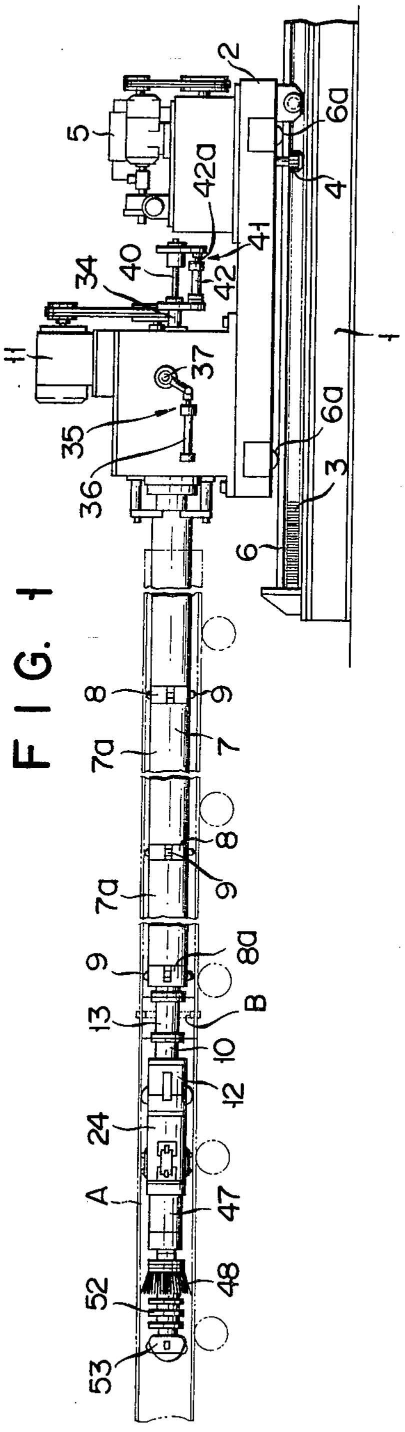
FIG. 1 is a front elevational view of an apparatus embodying this invention.

Referring to FIG. 1, a carriage 2 can travel on rails 6 laid on a base 1 by means of wheels 6*a* along a long pipe (steel pipe) A which has a medium or small diameter, a length of 6 to 12 meters and an outer diameter of 6 to 16 inches. The carriage 2 is provided with a pinion 4 engaged with a rack 3 provided on the lateral side of each rail 6, and an electric motor 5 for rotating the pinion 4. The carriage 2 can travel on the rails 6 by the rotation of the pinion 4. One end of a horizontally extended supporting tube 7 is supported by the carriage 2. The supporting tube 7 is inserted into the pipe A of a medium or small diameter by the travel of the carriage 2.

Figure 2:
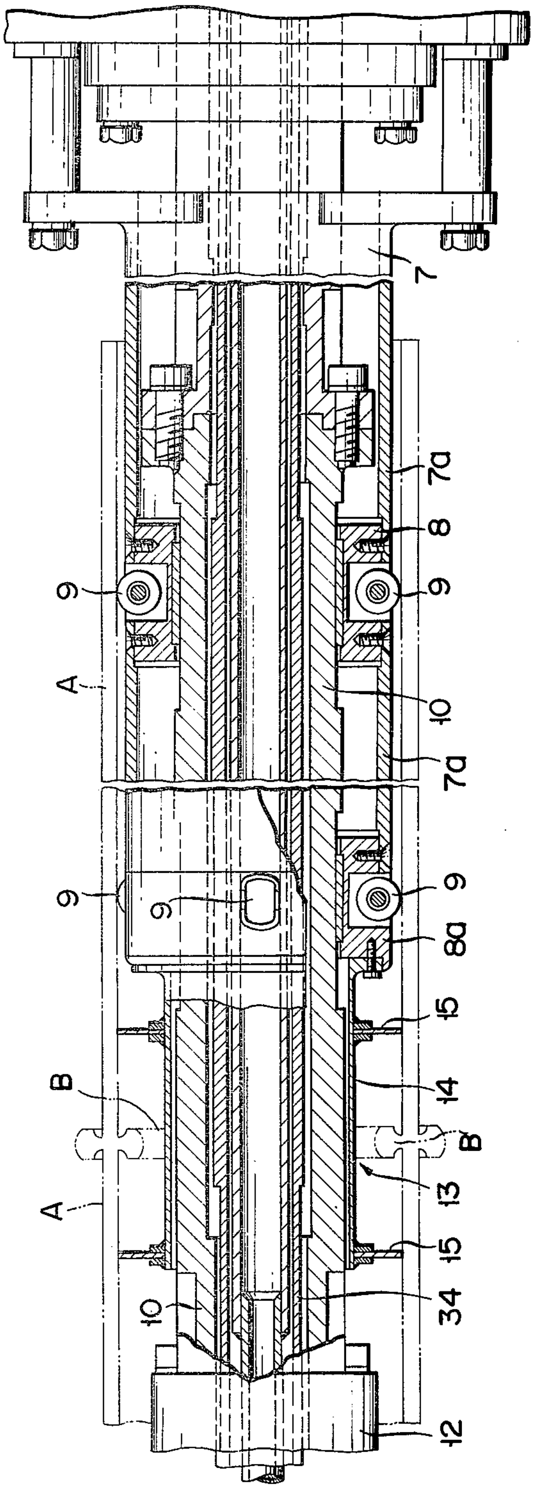
FIG. 2 is a longitudinal sectional view of part of FIG. 1, showing a spattering prevention device and guide rollers.

Referring to FIGS. 1 and 2, the supporting tube 7 comprises tube elements 7*a*, intermediate ring members 8 connecting together the corresponding ends of the adjacent tube elements 7*a* and a forward ring member 8*a* having the same construction as the ring member 8 provided on the forward end of the supporting tube 7. A plurality of guide rollers 9 is arranged on the ring members 8, 8*a* in a circumferentially equally spaced relation and supported thereby. The guide rollers 9 make rolling contact with the inner surface 8 of the pressure-welded pipe A.

A rotary shaft 10 is supported in the supporting tube 7 by the ring members 8, 8*a* acting as bearings, and is driven by an electric motor 11 mounted on the carriage 2, with a belt stretched between the pulleys mounted on the rear end of the rotary shaft 10 and the motor 11. The forward end of the rotary shaft 10 protrudes outward from the forward end of the supporting tube 7. The forward end of the rotary shaft 10 is fitted with a hollow cylindrical burr-cutting cutter head 12. A device 13 for preventing spatters from scattering during the pressure-welding of the pipes A (hereinafter referred to as the "spattering prevention device") is provided between the forward end of the supporting tube 7 and the cutter head 12. This spattering prevention device 13 comprises a tubular member 14 whose rear end is fixed to the forward end of the forward ring member 8a to loosely support the rotary shaft 10 and elastic, noninflammable annular plates 15 made of, for example, glass wool. The inner peripheral edge of each annular plate 15 is fixed to the outer peripheral planes of the tubular member 14 at both ends thereof. The outer peripheral surface of the annular plate 15 slidably contacts the inner surface of the pipe A.

Figure 4:
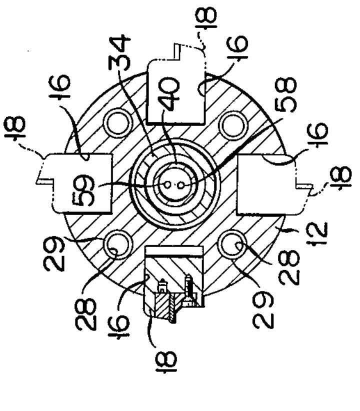
FIG. 4 is a cross sectional view along line 4—4 of FIG. 3.
Figure 3:
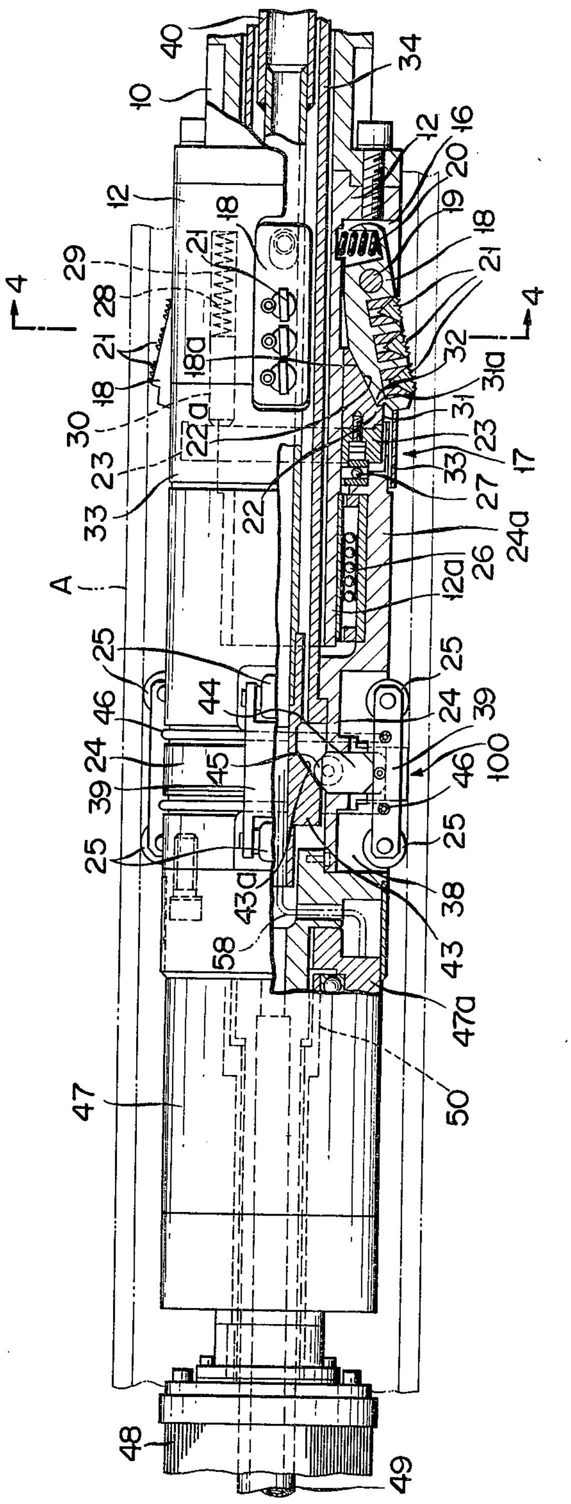
FIG. 3 shows a longitudinal sectional view of part of FIG. 1, showing an inner burr cutting device and a centering device.

Referring to FIGS. 3 and 4, the cutter head 12 comprises lengthwise extending grooves 16 circumferentially equidistantly formed in the periphery of the cutter head 12, and cutter holders 18 slidably fitted into the respective grooves 16 to extend lengthwise of the cutter head 12. The rear end portion of the cutter holder 18 (which is nearer to the spatter prevention device 13) is rotatably supported on the cutter head 12 by means of a pivot 19 such that the cutter holder 18 can rock radially of the cutter head 12. A compression coil spring 20 urges the cutter holder 18 to retract it into the groove 16. Cutters or cutter tips 21 are interchangeably mounted into the cutter holder 18 in series. When the cutter holder 18 is rotated against the spring 20, those of cutters 21 which are set nearer to the forward end side of the cutter holder 18 more closely approach the inner surface of the pipe A.

The cutter holder pusher 17 comprises, as shown in FIG. 3, a cutter holder-pushing tapered member 22 which is received in the groove 16 and reciprocates lengthwise of the cutter holder 18; a slide ring 23 which is loosely mounted on the outside of a tubular portion 12a protruding from the forward end of the cutter holder 18; and a hollow cylindrical pushing member 24a for forcefully shifting the slide ring 23 toward the cutter holder 18. The pushing member 24a is integrally formed with a support 24 of the later described centering rollers 25 and surrounds the tubular member 12a so as to be supported on the outside of the tubular member 12a by means of ball bearings 26 concurrently used for the slide and rotation of said pushing member 24a. The rear end of the pushing member 24a abuts against the corresponding end of the slide ring 23 rotated with the cutter head 12 through ball bearings 27 by a compression spring 28 placed in a blind hole 29 in the cutter head 12. The compression spring 28 elastically presses the slide ring 23 forward by means of a slide pin 30 in the blind hole 29. A stop portion 31 is formed at the terminal or outermost end portion of a tapered surface 22a of the tapered member 22. The stop portion 31 has a groove 31a with which a projecting engagement portion 32 formed at the forward end of the cutter holder 18 is made engageable. At the time of the engagement, the cutter holder 18 is rotated outward in the radial direction of the cutter head 12 to a maximum extent, a condition in which the foremost cutter 21 approaches the inner surface of the pipe A of a medium or small diameter at an extremely small interval of, for example, one millimeter. The stop portion 31 has a tapered surface 18a complementary to the tapered surface 22a of the tapered member 22 for engagement therewith. The stop portion 31 acts to push the engagement portion 32 in a direction opposite to that in which the cutter holder 18 is forced.

A hollow cylindrical protective cover 33 surrounds the forward end portion of the cutter head 12 so as to close an area around the forward end of the cutter holder 18 and the peripheral section of the space through which the tapered member 22 is shifted. The protective cover 33 prevents burr chips from being carried into a space defined between the stop portion 31 and engagement portion 32 and also into a space defined between the cutter holder 18 and tapered member 22.

A hollow cutter head pushing tubular rod 34 passes through the rotary shaft 10 and cutter head 12, and is reciprocable therethrough by a drive mechanism 35 (FIG. 1) mounted on the carriage 2. But the tube 34 is not rotated. The forward end of the cutter head pushing tubular rod 34 projects from the tubular member 12a of the head 12, and is fixed by the centering roller support 24 integrally formed with the pushing member 24a.

Referring to FIG. 1, the drive mechanism 35 for reciprocating the cutter head pushing tubular rod 34 comprises a hydraulic piston-cylinder assembly 36 mounted on the carriage 2; swingable link 37 swung by the hydraulic piston-cylinder assembly 36; and a mechanism (not shown) formed of, for example, a worm gearing to transmit the swing force of the swingable link 37 to the cutter-pushing tubular rod 34 for its reciprocation.

When burrs B (FIG. 1) begin to be cut off, the cutter head pushing tubular rod 34 is moved toward the carriage 2 by the action of the piston-cylinder assembly 6. This movement causes the tapered member 22 to be forced rearward of the cutter holder 18 by means of the pushing member 24a and ball bearings 27. The cutter holder 18 is pushed outward in the radial direction of the cutter head 12 until the engagement portion 32 of the cutter holder 18 is fitted into the groove 31a of the stop portion 31. The cutter holder 18 is retracted into the recess 16 (FIGS. 3 and 4), except when inner burrs B are cut off. When the piston-cylinder assembly 36 is operated in the opposite direction to the preceding case, and the cutter head pushing tubular rod 34 and pushing member 24a are brought back to the original position, both members 34, 24a recede from the tapered member 22. As a result, the cutter holder 18 is moved back into the recess 16 by the compression spring 20. Each of centering roller chambers 38 circumferentially equidistantly provided in the peripheral surface of the centering roller support 24 contains a centering roller support frame 39 which is movable to and from the inner surface of the pipe A. At least the peripheral surface portion of the centering rollers 25 is made of soft material such as copper or hard polyurethane resin which is little likely to abrade paint on the inner surface the pipe A. The centering rollers 25 are supported at both ends of the centering roller support frame 39.

Referring again to FIG. 1, a centering roller pushing rod 40 is inserted into the cutter head pushing rod 34 and is reciprocated along the pipe A by a drive mechanism 41 mounted on the carriage 2. As shown in FIG. 1, the drive mechanism 41 comprises a hydraulic cylinder 42 with the forward end fixed to the rear end of the cutter head pushing tubular rod 34 and a piston rod 42a reciprocatingly inserted into the cylinder 42 whose rear end is fixed to the rear end of the centering roller pushing rod 40 protruding from the free end of the cutter pushing rod 34.

Referring to FIG. 3, a centering mechanism 100 for pressing the centering rollers 25 against the inner surface of the pipe A comprises a hollow cylindrical centering tapered member 43 having a rear end coaxially connected to the forward end of the pushing rod 40 and formed with a conical surface 34a with its diameter increased toward the forward end of the tapered member 43; sliding members 44 disposed in the respective roller chambers 38 and adapted to be radially slidable in the support 24; and inner rollers (or guiding rollers) 45 supported on the inner ends of the respective sliding members 44. The outer end of each of the sliding members 44 is fixed by the centering roller support frame 39. Each roller 45 is normally elastically pressed against the tapered surface 43*a* of the conical surface 43 by coil spring bands 46 allowing for the retraction of centering rollers 25 into the roller chambers 38. In other words, the coil spring bands 46 surround the centering roller support 24 and pass through the support frame 39 such that they elastically press the centering roller support 39 toward the tapered member 43.

Before the centering rollers 25 are inserted into the pipe A, the centering roller pushing rod 40 is pushed into the extremely forward position, thereby causing the centering rollers 25 to be retracted into the centering roller chamber 38. Where the centering roller pushing rod 40 is moved rearward and consequently the centering tapered member 43 is moved in the same direction as said centering roller pushing rod 40, the centering mechanism 100 causes the centering rollers 25 to be moved radially outward of the centering roller support 24 for abutment against the inner surface of the pipe A.

The rearward movement of the centering roller pushing rod 40 is effected by actuating the hydraulic piston-cylinder assembly 42–42*a* before the tapered member 22 is pulled in the same direction as that in which the rearward movement is carried out. Accordingly, the centering rollers 25 are pressed against the inner surface of the pipe A, before the cutter holder 18 is pushed radially outward of the cutter head 12. Thereafter, the centering roller pushing rod 40, an assembly of the centering roller support 24, pushing member 24*a* and tapered member 22 and cylinder 42 are pulled in a body toward the carriage 2 by actuating the piston-cylinder assembly 36. As a result, the cutter holder 18 can progressively come out of the cutter head 12, with the centering rollers 25 pressed against the inner surface of the pipe A.

Figure 5:
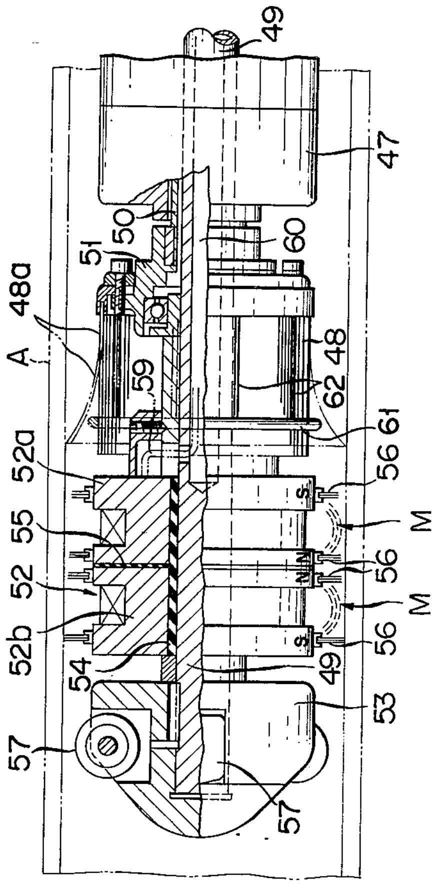
FIG. 5 shows a longitudinal sectional view of part of FIG. 1, showing a spatter crushing device, an electromagnet device and a foremost end guide member.

As shown in FIGS. 3 and 5, a rotary wire brush 48 is rotated by a wire brush driving electric motor 47 set ahead of the centering rollers 25. The motor 47 has a hollow cylindrical shaft 50. A long support shaft 49 coaxially extends from the forward end of the centering roller support 24 with its rear end fixed to the support 24. The body 47*a* of the motor 47 is fixedly mounted on the support shaft 49 such that the shaft 49 coaxially passes the motor shaft 50. The wire brush 48 is formed by bundling a large number of metal wires 48*a*, for example, steel wires. The rear end of the wire brush 48 is fixed to a ring-shaped rotary frame 51 fixedly mounted on the forward end portion of the motor shaft 50. When the wire brush 48 is rotated by the motor 47, the forward end of the wire brush 48 is expanded by a centrifugal force resulting from the rotation of the motor shaft 50, and forward free ends of the brush wires 48*a* are pressed against the inner surface of the pipe A as indicated by chain lines in FIG. 2. As more frequently applied, the wire brush 48 is more likely to remain expanded, probably presenting difficulties in the insertion of the wire brush 48. To avoid such difficulties, the forward end of the wire brush 48 is wound with a weak spring band 61, which, when a centrifugal force is applied to the wire brush 48, does not obstruct its expansion, but in the absence of the centrifugal force, lets the wire brush 48 regain its original cylindrical form. The spring band 61 is fastened to the rotary frame 51 by connecting wires 62 to prevent it from coming off.

Set ahead of the wire brush 48 is a chip and spatter attracting electromagnet device 52, in front of which (that is, at the foremost end of the burr cutting apparatus) a foremost end guide member 53 is provided. The electromagnet device 52 and guide member 53 are loosely inserted into the support shaft 49 protruding ahead of the wire brush 48. The electromagnet device 52 is formed by connecting pairs of, for example, D.C. electromagnets 52*a*, 52*b* each having a magnetic flux density of about 5,000 Gausses in the axial direction of the support shaft 49 with a magnetic insulation board 55 interposed between the respective paired electromagnets 52*a*, 52*b*. The respective paired electromagnets 52*a*, 52*b* are fixed to the outer surface of the support shaft 49 with a magnetic insulation hollow cylindrical member 54 interposed between the paired electromagnets 52*a*, 52*b* on one hand and the outer surface of the support shaft 49 on the other. The paired electromagnets 52*a*, 52*b* are set in place with the magnetic insulation board 55 interposed therebetween. In this case, the same poles (for example, N poles) of the electromagnets 52*a*, 52*b* are set closely adjacent to each other. The electromagnet device 52 which is formed of pairs of radially projecting (or radially swelled) electromagnets 52*a*, 52*b* can attract chips and spatters over a broad area. The same poles (for example, N) of the respective paired electromagnets 52*a*, 52*b* are set adjacent to each other, thereby preventing magnetic lines produced by the respective paired electromagnets 52*a*, 52*b* from interfering with each other. A wire brush 56 is projectively provided on the periphery of each of the pole portions of the electromagnets 52*a*, 52*b* to elevate the chip and spatter attracting efficiency of the electromagnet assembly 52. In this case, those of the wire brushes 56 which are set more forward protrude from said pole portions at progressively greater lengths. The foremost wire brush 56 has a sufficiently great length to face the inner surface of the pipe A at an extremely small interval or spacing, such as one millimeter. Provided on the peripheral surface of the foremost end guide member 53 are guide rollers 57 whose peripheral surfaces project from a surface flush with the peripheral surface of the electromagnets 52*a*, 52*b*. These guide rollers 57 prevent the electromagnets 52*a*, 52*b* from being magnetically attracted to the inner surface of the steel pipe A, when the electromagnet device 52 absorbs chips and spatters. Even if the wire brush 56 is magnetically attracted to the inner surface of the pipe A, the attracting force is weak. Moreover, the wire brush 56 moves along the inner surface of the pipe A while being elastically deformed. Therefore, it is unnecessary to provide an arrangement to prevent the wire brush 56 from being magnetically attracted to the inner surface of the pipe A.

Referring to FIG. 3, the wire brush-driving motor 47 is connected to a power supply cable 58 (FIG. 3). The electromagnet device 52 is connected to another power supply cable 59 (FIG. 5). These power supply cables 58, 59 are inserted into a hollow centering roller pushing rod 40 and the support shaft 49, respectively. The power supply cable 59 connected to the electromagnet device 52 runs through a cable passage 60 provided in the support shaft 49. The rear ends of the power supply cables 59, 60 are connected to a power supply device (not shown) mounted on the carriage 2. For convenience of description, that section of the apparatus which is defined between the rear end of the supporting tube 7 and the foremost end guide member 53 is generally referred to as a tube-received section.

Two long pipes A of a medium or small diameter are first aligned end to end before they are pressure-welded. The above-mentioned tube-received section is inserted into the aligned pipes A. Upon completion of the pressure-welding of the pipes A, the tube-received section is pulled out of the pressure-welded pipes A, while cutting off inner burrs B (that is, burrs B produced on the inner surface of the pressure-welded portions of the pipes A), followed by the sweeping of chips and spatters from the pipe interior.

In operation, the tube-received section is inserted into the aligned pipes A by letting the carriage 2 travel forward, with the cutter holder 18 and centering rollers 25 retracted. The carriage 2 is brought to rest, with the end-to-end abutting sections of the aligned pipes A set between both elastic annular plates 15 of the spattering prevention device 13. The tube-received section is inserted into the end-to-end aligned pipes A at a relatively high speed. Since, however, the cutter holders 18 remain retracted, even paint which is applied on the inner surface of the aligned pipes A is not damaged at the time of said insertion. After being inserted into the aligned pipes A, the centering rollers 25 are moved by the actuation of the piston-cylinder assembly 42–42*a* to lightly touch the inner surface of the aligned pipes A. The end-to-end abutting sections of the aligned pipes A are pressure-welded, after the insertion of the tube-received section is brought to an end. Spatters resulting from the pressure-welding of the aligned pipes A are prevented from being scattered through the pipes A over a wide area by means of the spattering prevention device 13. After the pressure-welding of the pipes A, the piston-cylinder assembly 42–42*a* is further actuated to tightly press the centering rollers 25 against the inner surface of the pressure-welded pipes A, thereby ensuring the centering of the tube received section. After the centering is effected, the piston-cylinder assembly 36 is actuated to push the cutter holders 18 radially outward of the cutter head 12 to a maximum extent such that the foremost cutters 21 approach the inner surface of the welded pipes A. Cutting of an inner burr B which is produced on the inner surface of the welded pipes A is started by causing the carriage 2 to run backward at a low speed, while the cutter head 12 is rotated due to the rotation of the rotary shaft 10 driven by the motor 11. Since the cutter holders 18 are set by the tapered member 22 in an inclined position to the inner surface of the welded pipes A as shown in FIG. 3, the cutters 21 nearer to the forward end of each holder 18 approach the inner surface of the pipes A more closely. As the tube received section is retracted, the rear cutters remove the innermost portion of the inner burr B at first. Then, the intermediate cutters cut off the intermediate portion of the burr B, and finally the forward cutters take off the remaining portion of the burr B. Accordingly, the inner burr B is successively and smoothly removed by all the cutters 21. The shifting of the cutter head 12 at the time of the cutting of the inner burr B may be effected by retracting only the rotary shaft 10 and drive means thereof through a proper mechanism (for example, a screw shaft), with the carriage 2 kept at rest.

Upon completion of the cutting of the inner burr B, the piston-cylinder assembly 36 is actuated to retract the cutter holders 18 into the grooves 16 of the cutter head 12. The piston-cylinder assembly 42–42*a* is actuated slightly backward to release the pressing force of the centering rollers 25 applied to the inner surface of the pipe A. Thereafter, the carriage 2 is retracted at a slightly increased speed. Power is supplied to the wire brush-driving motor 47 and magnet device 52 to start the cleaning of the interior of the pipes A in which the burr cutting has been brought to an end. Said cleaning is effected by driving the motor 47 to rotate the wire brush 48, crushing chips and spatters by the brush wires 48*a* which are pressed against the inner surface of the pipe A while being rotated due to the centrifugal force applied to the brush, and thereafter adsorbing crushed burr chips and spatters by the electromagnet device 52. The cleaning of the pipe interior by the wire brush 48 is brought to an end at a proper time. However, the adsorption of crushed burr chips and spatters by the electromagnet device 52 is continued, until the tube-received section is pulled out of the pipe A. After pulling out the tube received section, the supply of the direct electric current is interrupted to the electromagnet device 52, and then reverse polarity direct electric current is supplied thereto for a predetermined time, for example, 2 to 3 seconds such that a reverse polarity magnetic field is generated around the electromagnet device 52 to remove the chips and spatters therefrom.

According to the foregoing embodiment, the centering rollers 25 were pushed forward by the centering roller pushing rod 40, utilizing its tapered surface. However, the pushing of the centering rollers 25 need not be effected exclusively by the above-mentioned process. Further, the tube-received section was inserted into the pipe A before it was pressure-welded. However, said insertion may be carried out after the pressure-welding of the pipe A. In this case, the tube-received section need not be provided with the spattering prevention device 13. According to the foregoing embodiment, the wire brush 48 was used to crush spatters. However, the wire brush 48 may be replaced by a wire rope, a chain or a wire whose leading end is fitted with a weight.

A burr-cutting and pipe interior-cleaning apparatus embodying this invention is not restricted to the aforesaid type which is provided with a mechanism for crushing burr chips and spatters and an electromagnet device for adsorbing said crushed chips and spatters. The apparatus has the advantage of cutting off burrs produced on the inner surfaces of pressure-welded pipes without damaging paint even if it is applied on said inner surfaces.

What we claim is:

1. An inner burr and inner surface cleaning apparatus for pipes of medium and small diameters comprising:

a base;

a carriage mounted on the base and reciprocable along a long pressure-welded pipe of medium and small diameters having an inner burr produced on an inner surface thereof;

a supporting tube inserted into the pressure-welded pipe and having one end supported by the carriage and the other end opened;

first drive means mounted on the carriage;

a hollow cylindrical rotary shaft passing through the supporting tube with one end protruding from said other end of the supporting tube and rotated at the other end by the first drive means;

inner burr cutting means fixedly mounted on the rotary shaft for cutting off the inner burr;

sets of guide rollers, each of said sets being arranged circumferentially on an outer periphery of the supporting tube for contacting the inner surface of the pressure-welded pipe;

centering means disposed at the other end of the supporting tube for centering the inner burr cutting means in the pressure-welded pipe;

second drive means mounted on the centering means;

spatter crushing means disposed adjacent to the second drive means and rotated thereby for crushing spatters produced in the pressure-welded pipe;

electromagnet means disposed at either one of an end of the crushing means which is nearer to the carriage and an end of the crushing means which is more remote from the carriage, said electromagnet means being used for attracting chips and spatters in the pressure-welded pipe; and spattering prevention means disposed between the inner burr cutting means and said one end of the supporting tube.

2. The apparatus according to claim 1, wherein said inner burr cutting means comprises:

a hollow cutter head mounted on the rotary shaft;

cutter holders circumferentially equidistantly arranged in the cutter head and adapted to be pushed out of, and retracted into, the cutter head;

cutters received in the cutter holders to protrude therefrom; and a cutter holder pushing mechanism for pushing the cutter holders to cause them to protrude from the cutter head.

3. The apparatus according to claim 2, wherein said cutter holder comprises:

a pivot for pivoting an end portion of the cutter holder which is nearer to the carriage to the cutter head;

a spring provided between the cutter head and cutter holder for normally urging the cutter holder to retract it into the cutter head; and a tapered surface formed on a lateral side portion which faces the cutter head and which is disposed more remote from the carriage; and wherein said cutter holder pushing mechanism comprises:

a cutter holder pushing rod penetrating the rotary shaft;

a drive mechanism mounted on the carriage for reciprocating the cutter holder pushing rod through the rotary shaft;

a tapered member which is fixed to the cutter holder pushing rod and slidably surrounds the rotary shaft; and a tapered surface which is formed complementary with the tapered surface of the cutter holder on one side of the tapered member, which faces the tapered surface of the cutter head for slidably contacting therewith.

4. The apparatus according to claim 3, wherein stop means is provided between the tapered member and cutter holder for restricting an amount of projection of the cutter holder from the cutter head.

5. The apparatus according to claim 4, wherein said stop means comprises:

a protruding engagement portion provided at an end of the cutter holder which is most remote from the carriage; and a stop portion formed on the peripheral surface of the tapered member and having an engagement groove engaged by the engagement portion.

6. The apparatus according to claim 5, comprising a protective cover surrounding the stop portion of the stop means.

7. The apparatus according to claim 1, wherein said spatter crushing means comprises elongated spatter crushing members each rotated at one end by the second drive means and the other end adapted to contact the inner surface of the pressure-welded pipe due to a centrifugal force produced by the rotation of the spatter crushing members.

8. The apparatus according to claim 7, wherein said spatter crushing means includes a rotary frame rotated by the second drive means and said spatter crushing members comprise a bundle of brush wires each normally extending along the pressure-welded pipe and having said one end connected to the rotary frame.

9. The apparatus according to claim 1, wherein said electromagnet means comprises a cylindrical electromagnet disposed coaxial with the rotary shaft and provided on both ends with magnetic poles having polarities opposite to each other.

10. The apparatus according to claim 9, wherein said electromagnet means further comprises another cylindrical electromagnet which has the same construction as the first mentioned cylindrical electromagnet and which is arranged in series therewith.

11. The apparatus according to claim 10, wherein those ends of the closely adjacent cylindrical magnets which face each other have the same polarity.

12. The apparatus according to claim 9, 10 or 11, wherein a plurality of wire brushes protrude radially outward from the ends of the cylindrical magnets, and are successively more reduced in length as the wire brushes are nearer to the carriage.

13. The apparatus according to claim 9, 10 or 11, wherein said cylindrical magnet is an electromagnet.

14. The apparatus according to any one of claims 3 to 6, wherein said centering means comprises:

a centering roller support disposed coaxial with the cutter head and non-rotationally carried thereby;

a reciprocating mechanism provided on the carriage;

a centering rod passing through the supporting tube and having one end portion extending in the centering roller support, said reciprocating mechanism being reciprocated at the other end portion thereof by the reciprocating mechanism;

a centering tapered member provided on said one end portion of the centering rod and provided on an outer periphery with a conical surface;

sliding members arranged circumferentially equidistantly of the centering roller support and radially slidable therethrough;

guiding rollers each supported by one end of each of the sliding members and abutting on the conical surface of the centering tapered member; and centering rollers each supported by the other end of each of the sliding members and adapted to contact the inner surface of the pressure-welded pipe.

15. The apparatus according to claim 14, wherein said centering means includes spring bands for urging the sliding members toward the conical surface of the centering tapered member.

16. The apparatus according to claim 1, wherein there is provided at an end of the apparatus most remote from the carriage a guide member for introducing the electromagnetic means, the spatter crushing means, the centering means, the inner burr cutting means and the spattering prevention means into the pressure-welded pipe.

* * * * *